(12) United States Patent
Ruland

(10) Patent No.: US 9,305,466 B2
(45) Date of Patent: Apr. 5, 2016

(54) DYNAMIC ILLUSTRATION GENERATION SYSTEM

(71) Applicant: Michael Ruland, Houston, TX (US)

(72) Inventor: Michael Ruland, Houston, TX (US)

(*) Notice: Subject to any disclaimer, the term of this patent is extended or adjusted under 35 U.S.C. 154(b) by 429 days.

(21) Appl. No.: 13/717,695

(22) Filed: Dec. 17, 2012

(65) Prior Publication Data

US 2013/0157241 A1    Jun. 20, 2013

Related U.S. Application Data

(60) Provisional application No. 61/576,909, filed on Dec. 16, 2011.

(51) Int. Cl.
 *G09B 23/12* (2006.01)
 *G09B 19/00* (2006.01)

(52) U.S. Cl.
 CPC .............. *G09B 19/00* (2013.01); *G09B 23/12* (2013.01)

(58) Field of Classification Search
 CPC ........................................... G09B 23/12
 USPC ................... 366/114–116, 314, 605, 273
 See application file for complete search history.

(56) References Cited

U.S. PATENT DOCUMENTS

| | | | | |
|---|---|---|---|---|
| 1,718,745 A * | 6/1929 | Lawrence | ............ | 366/251 |
| 1,854,761 A * | 4/1932 | Perkins | ............ | 366/270 |
| 7,677,790 B2 * | 3/2010 | Tessien | ............ | 366/108 |
| 2002/0167861 A1 * | 11/2002 | Barton et al. | ............ | 366/142 |
| 2004/0082280 A1 * | 4/2004 | Lim et al. | ............ | 451/50 |
| 2012/0264357 A1 * | 10/2012 | Shim | ............ | 451/103 |

* cited by examiner

*Primary Examiner* — David Sorkin
(74) *Attorney, Agent, or Firm* — Shannon L Warren

(57) ABSTRACT

A dynamic illustration generation system is disclosed. Said dynamic illustration generation system comprises a tank, a fluid medium, a fluid impeller and a rotary drive source. Said tank having a four walls and a base portion. Said rotary drive source attached to said fluid impeller.

18 Claims, 9 Drawing Sheets

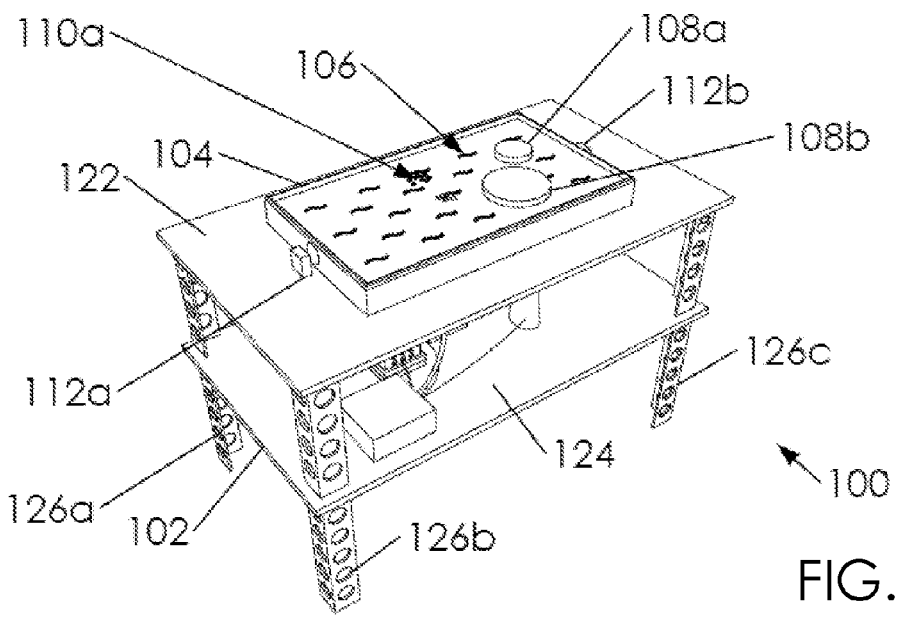
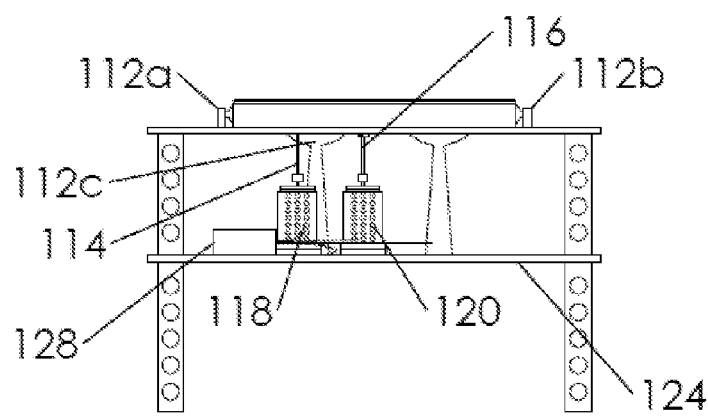 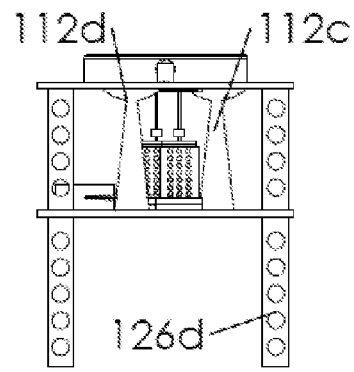
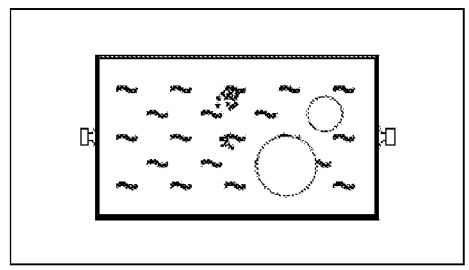
FIG. 1A
FIG. 1B    FIG. 1C
FIG. 1D

DYNAMIC ILLUSTRATION GENERATION SYSTEM

BACKGROUND

This disclosure relates generally to a dynamic illustration generation system. None of the previously known inventions and/or patents, taken either singularly or in combination, is seen to describe the instant disclosure as claimed. Accordingly, an improved dynamic illustration generation system would be advantageous.

SUMMARY

A dynamic illustration generation system is disclosed. Said dynamic illustration generation system comprises a tank, a fluid medium, a fluid impeller and a rotary drive source. Said tank having a four walls and a base portion. Said rotary drive source attached to said fluid impeller.

BRIEF DESCRIPTION OF THE DRAWINGS

FIGS. 1A, 1B, 1C and 1D illustrate a perspective overview, an elevated front view, elevated first side view, and an elevated top view of a dynamic illustrator with a support structure.

DETAILED DESCRIPTION

Figure 2:
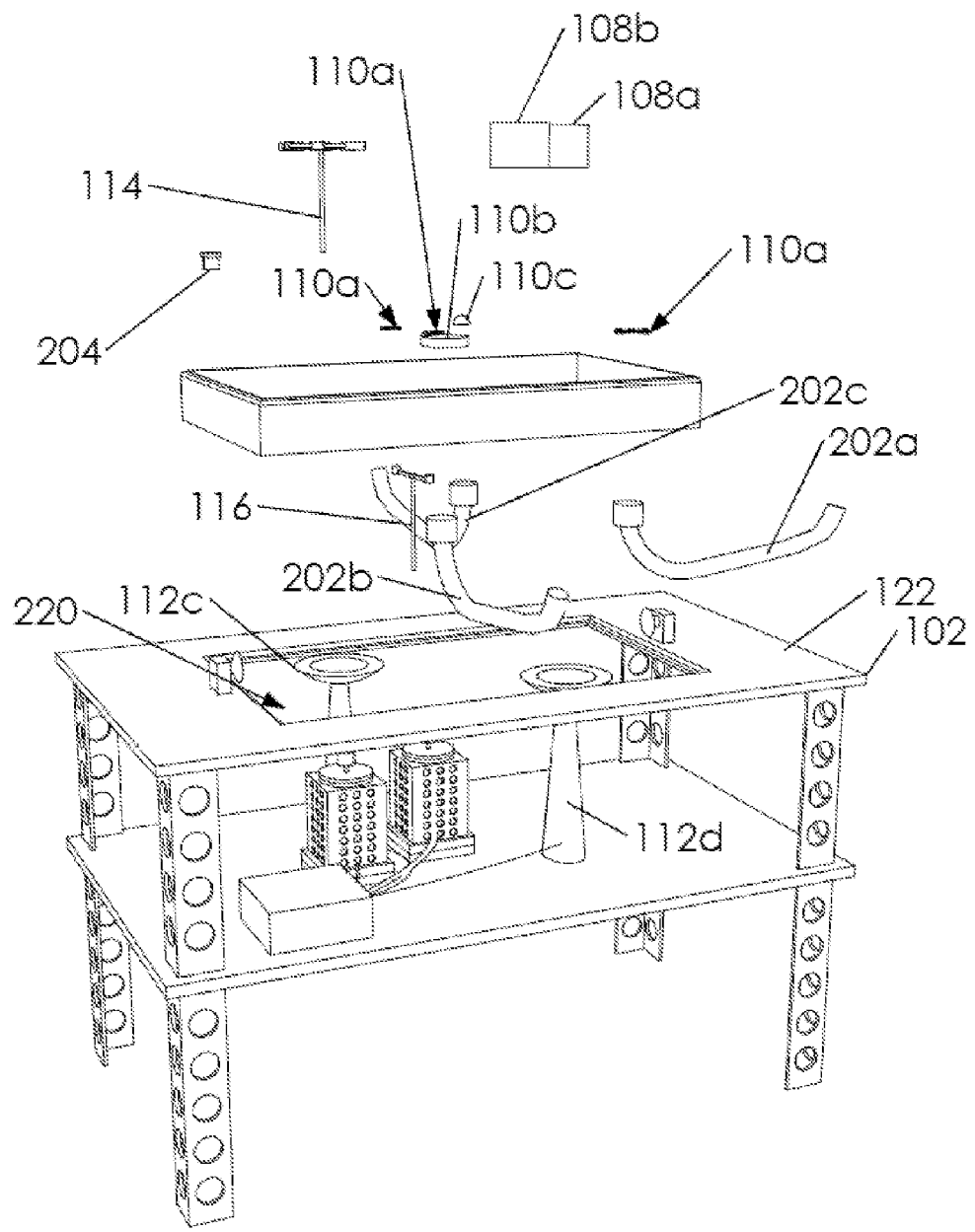
FIG. 2 illustrates a perspective exploded overview of said dynamic illustrator with said support structure.

Described herein is a dynamic illustration generation system. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

FIGS. 1A, 1B, 1C and 1D illustrate a perspective overview, an elevated front view, elevated first side view, and an elevated top view of a dynamic illustrator 100 with a support structure 102. In one embodiment, said dynamic illustrator 100 can comprise said support structure 102 holding a tank 104 and a fluid medium 106 in said tank 104. In one embodiment, said tank 104 can contain a one or more stationary objects and/or a one or more non-stationary objects. In one embodiment, said one or more stationary objects can comprise a first island 108a and a second island 108b. In one embodiment, said one or more non-stationary objects can comprise a one or more ferromagnetic objects and/or a one or more non-ferromagnetic objects. In one embodiment, said one or more non-stationary objects can comprise a one or more shards 110a, a one or more polygons 110b (not illustrated here) and/or a one or more spheres 110c (not illustrated here). In one embodiment, said one or more non-stationary objects can move about in said fluid medium 106 within said tank 104. In one embodiment, said dynamic illustrator 100 can comprise a one or more speakers which can comprise a first speaker 112a, a second speaker 112b, a third speaker 112c and a fourth speaker 112d. In one embodiment, said one or more speakers can direct sound waves at said tank 104 from below said tank 104 or from a one or more sides of said tank 104. In one embodiment, said dynamic illustrator 100 can comprise a fluid impeller 114 and a magnetic impeller 116. In one embodiment, said dynamic illustrator 100 can comprise one or more rotary drivers which can comprise a first driver 118 and a second driver 120. In one embodiment, said first driver 118 can drive said fluid impeller 114 with a rotary force, and said second driver 120 can drive said magnetic impeller 116. In one embodiment, said support structure 102 can comprise a top deck 122, a lower deck 124 and a one or more legs (comprising a first leg 126a, a second leg 126b, a third leg 126c, and a fourth leg 126d). In one embodiment, said one or more legs can support said top deck 122 and said lower deck 124. In one embodiment, said lower deck 124 can attach to said one or more legs half way up said one or more legs, and said top deck 122 can attach at a top end of said one or more legs. In one embodiment, said dynamic illustrator 100 can comprise a controller 128 attached to said one or more speakers and/or said one or more rotary drivers with a one or more wires. In one embodiment, said controller 128 can control said one or more speakers and said one or more rotary drivers by sending a one or more electronic signals through said one or more wires. Said one or more wires can attach to said first speaker 112a, said second speaker 112b, said third speaker 112c (not illustrated here), said fourth speaker 112d (not illustrated here), said first driver 118 and said second driver 120. In one embodiment, said third speaker 112c, said fourth speaker 112d, said first driver 118, said second driver 120, and said controller 128 can rest on said lower deck 124. In one embodiment, said tank 104 can rest on a portion of said top deck 122.

FIG. 2 illustrates a perspective exploded overview of said dynamic illustrator 100 with said support structure 102. In one embodiment, said dynamic illustrator 100 can comprise a one or more magnetic handles. In one embodiment, said one or more magnetic handles can comprise a first magnetic handle 202a, a second magnetic handle 202b and a third magnetic handle 202c. In one embodiment, a portion of said one or more magnetic handles can comprise a magnetic head capable of moving one or more of said one or more ferromagnetic objects, which are located within said tank 104. In one embodiment, said first magnetic handle 202a can move one or more of said one or more shards 110a, said second magnetic handle 202b can move one or more of said one or more polygons 110b, and said third magnetic handle 202c can move one or more of said one or more spheres 110c. In one embodiment, said one or more spheres 110c can comprise a half sphere. In one embodiment, said dynamic illustrator 100 can comprise a plug 204 capable of plugging a drain (not illustrated here). In one embodiment, said support structure 102 can comprise an aperture 220 in said top deck 122. In one embodiment, a portion of said tank 104 can fit through and into a portion of said aperture 220. In one embodiment, a portion of said fluid impeller 114 can pass through said aperture 220.

Figure 3:
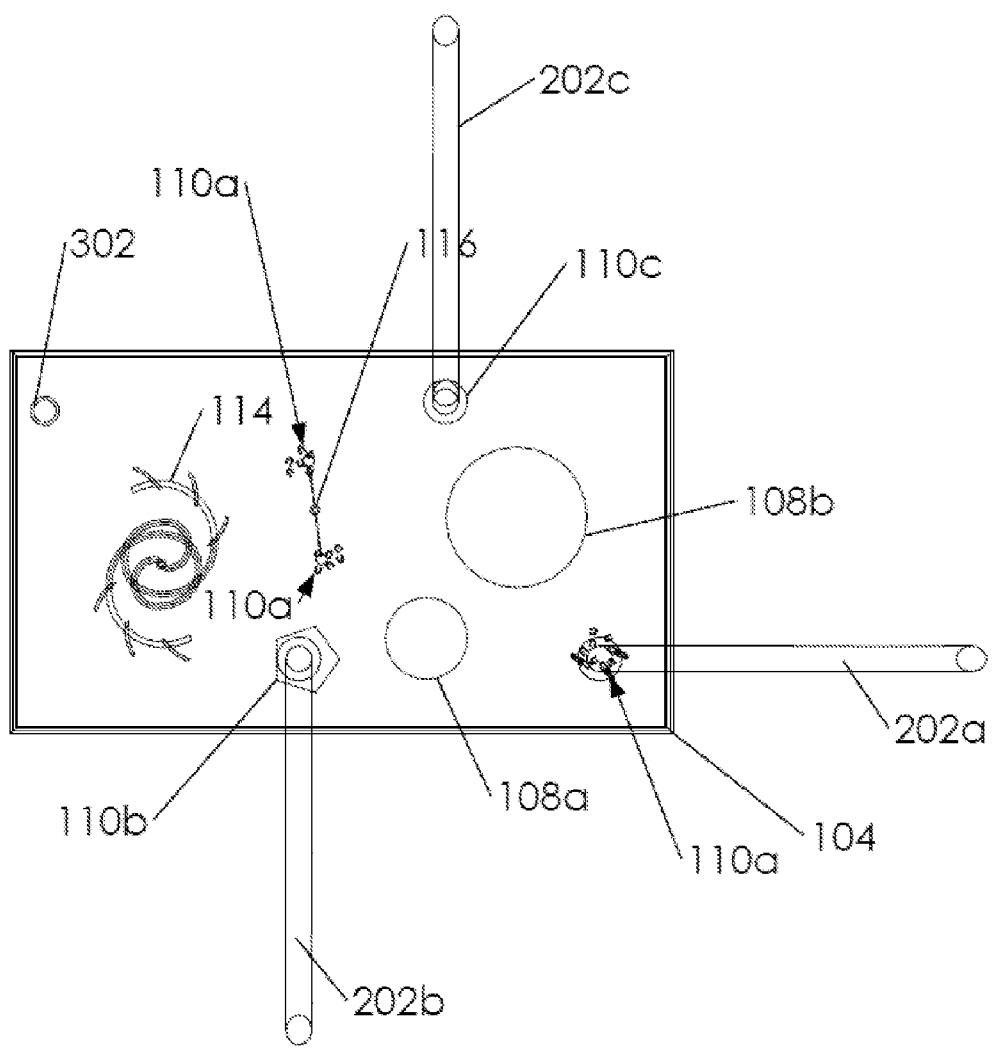
FIG. 3 illustrates an elevated top transparent (that is, wireframe) view of said dynamic illustrator.

FIG. 3 illustrates an elevated top transparent (that is, wireframe) view of said dynamic illustrator 100. In one embodiment, said tank 104 can comprise a drain 302. In one embodiment, said one or more magnetic handles can each be used to move a portion of said one or more non-stationary objects. In one embodiment, said one or more non-stationary objects can move around said one or more stationary objects within said tank 104.

Figure 4A:
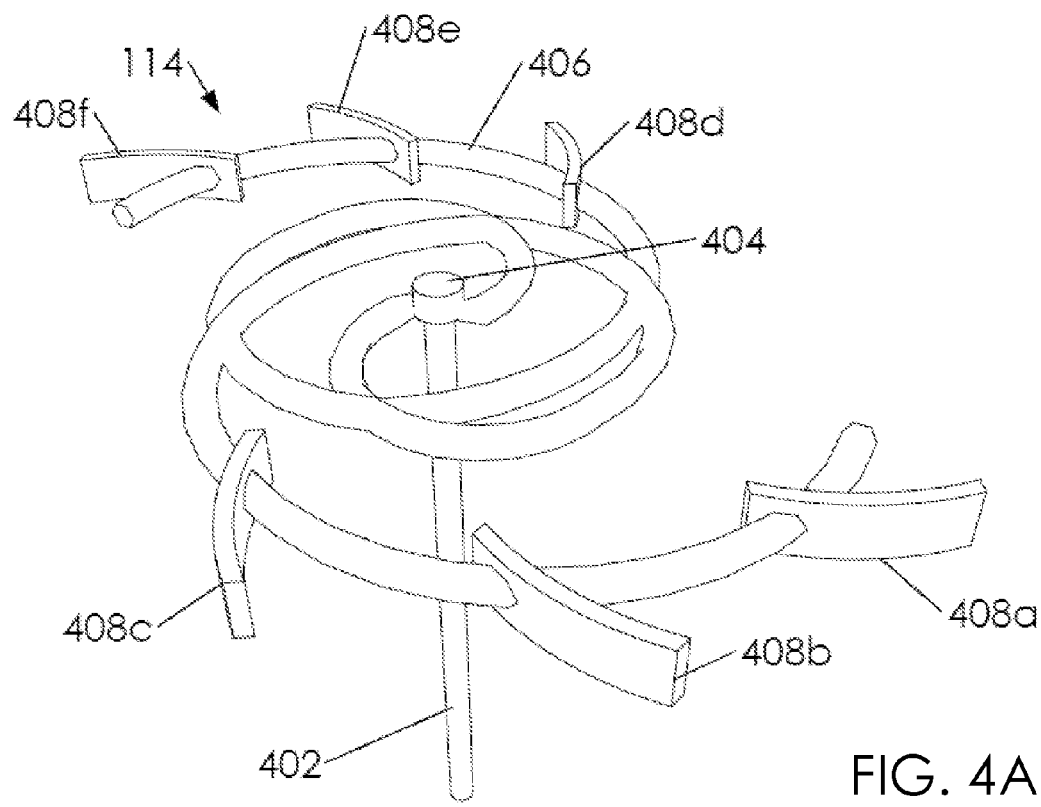
FIGS. 4A, 4B and 4C illustrate a perspective overview, an elevated top view and an elevated front side view of said fluid impeller.
Figures 4B, 4C:
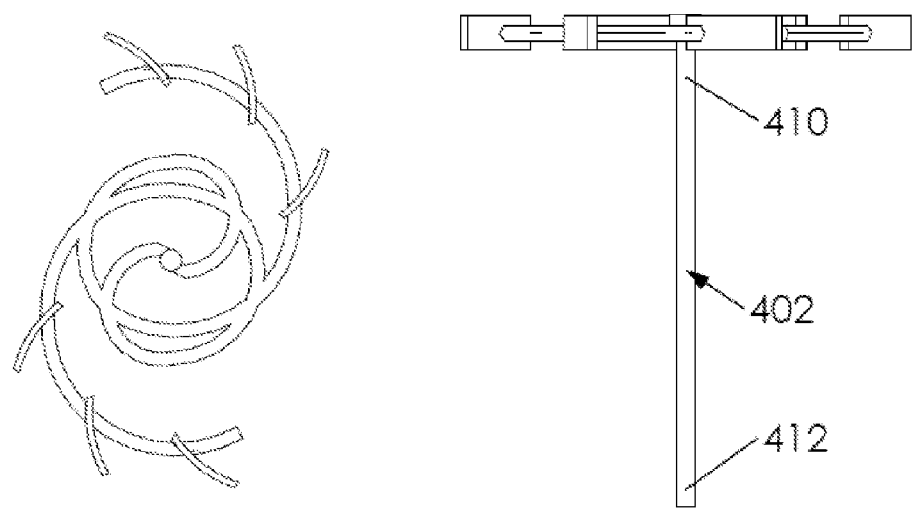

FIGS. 4A, 4B and 4C illustrate a perspective overview, an elevated top view and an elevated front side view of said fluid impeller 114. In one embodiment, said fluid impeller 114 can stir and/or move said fluid medium 106. In one embodiment, said fluid impeller 114 can comprise a shaft 402, a head 404, a one or more arms 406 and a one or more paddles. In one embodiment, said one or more paddles can comprise a first paddle 408a, a second paddle 408b, a third paddle 408c, a fourth paddle 408d, a fifth paddle 408e, and a sixth paddle 408f. In one embodiment, said shaft 402 can comprise a cylindrical member having first end 410 and a second end 412. In one embodiment, said second end 412 can attach to said first driver 118; said first driver 118 can revolve said fluid impeller 114 at said second end 412 of said shaft 402. In one embodiment, said head 404 can be at said first end 410 of said shaft 402. In one embodiment, said head 404 can attach to said one or more arms 406. In one embodiment, said one or more paddles can attach to said one or more arms 406.

Figure 5A:
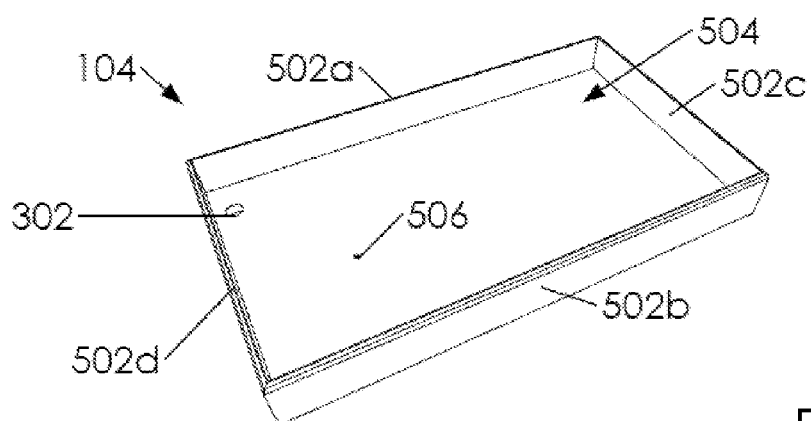
FIGS. 5A, 5B and 5C illustrate a perspective overview, an elevated top view and an elevated side view of said tank.
Figure 5B:
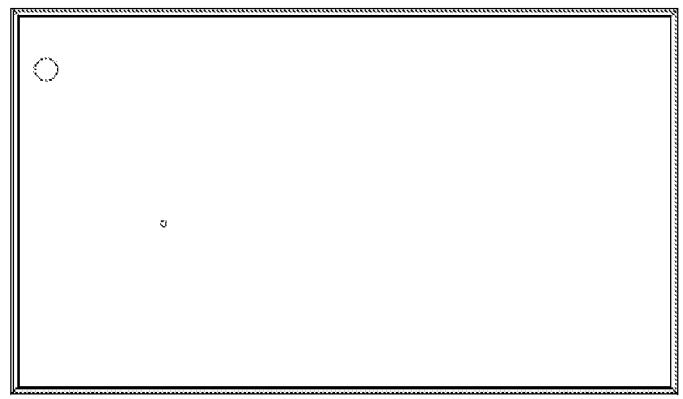
Figure 5C:
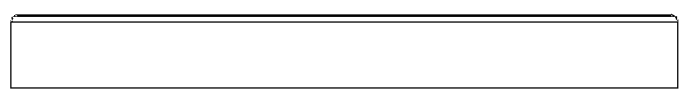

FIGS. 5A, 5B and 5C illustrate a perspective overview, an elevated top view and an elevated side view of said tank 104. In one embodiment, said tank 104 can comprise a four walls. In one embodiment, said four walls can comprise a first wall 502a, a second wall 502b, a third wall 502c and fourth wall 502d. In one embodiment, said tank 104 can comprise a base portion 504. In one embodiment, said base portion 504 can comprise said drain 302 and an aperture 506. In one embodiment, said aperture 506 can allow a portion of said shaft 402 of said fluid impeller 114 to pass through said base portion 504 of said tank 104.

Figure 6A:
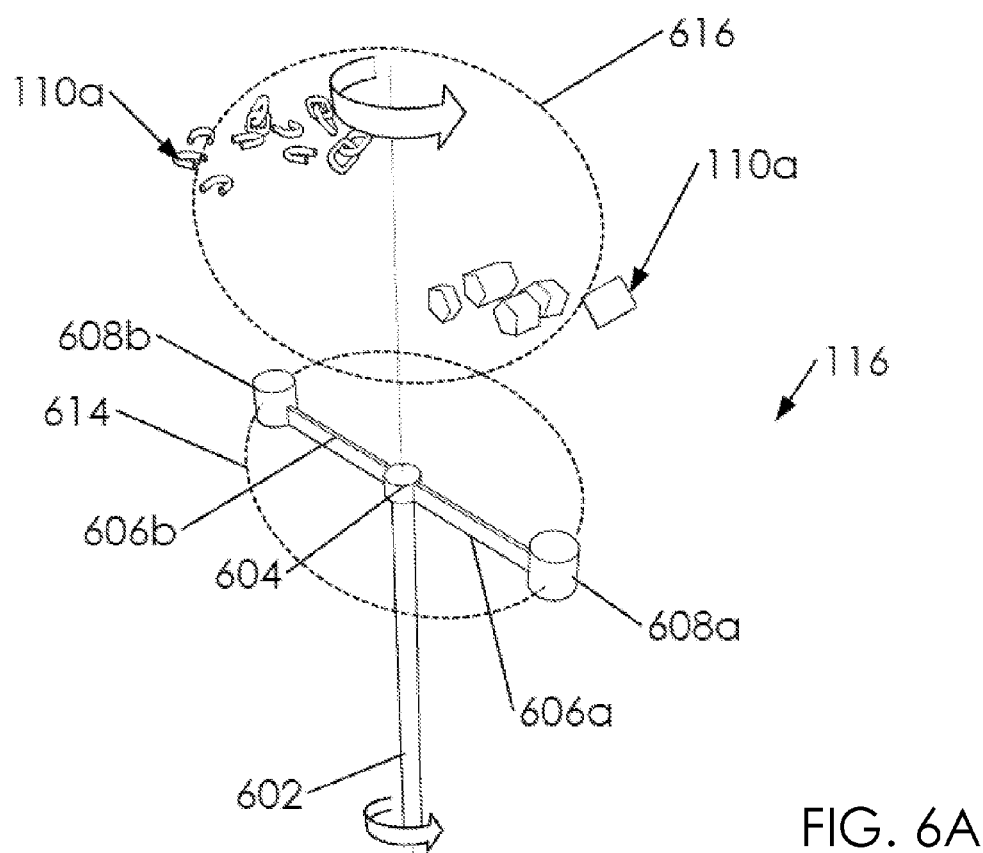
FIGS. 6A, 6B and 6C illustrate a perspective overview, and an elevated top view and front view of said magnetic impeller with one or more of said one or more shards.
Figures 6B, 6C:
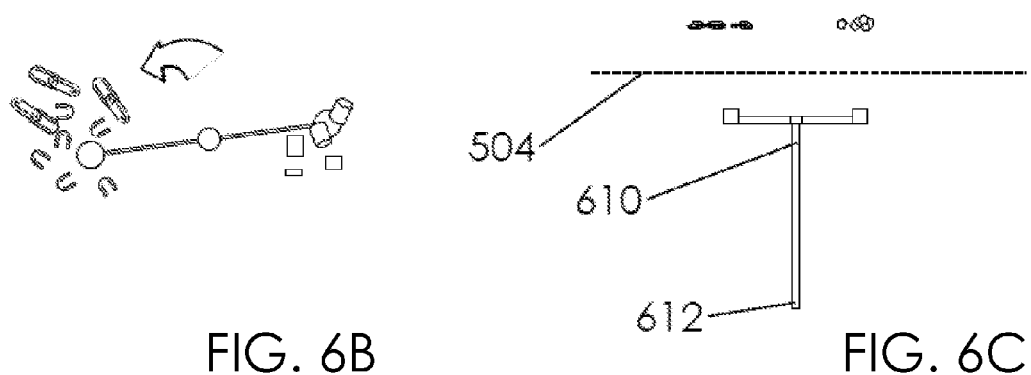

FIGS. 6A, 6B and 6C illustrate a perspective overview, and an elevated top view and front view of said magnetic impeller 116 with one or more of said one or more shards 110a. In one embodiment, said magnetic impeller 116 can comprise a shaft 602, a head 604, a one or more arms and a one or more magnetic heads. In one embodiment, said one or more arms can comprise a first arm 606a and a second arm 606b, and said one or more magnetic heads can comprise a first magnetic head 608a and a second magnetic head 608b. In one embodiment, said shaft 602 can comprise a first end 610 and a second end 612. In one embodiment, said second driver 120 can attach to said second end 612 of said fluid impeller 114. In one embodiment, said head 604 can attach to said first end 610 of said magnetic impeller 116. In one embodiment, said one or more arms/can attach to said head 604 at one end and said one or more magnetic heads at another end. In one embodiment, said magnetic impeller 116 can rotate about said shaft 602 and thereby rotate said one or more magnetic heads around in a predefined path 614. In one embodiment, as said one or more magnetic heads rotate along said predefined path 614, said one or more polygons 110b can rotate about a corresponding predefined path 616. In one embodiment, said one or more shards 110a can comprise one or more "U" shaped members, one or more chain links, and/or one or more pieces of ferromagnetic material such as shards of metal. In one embodiment, said one or more shards 110a can be pulled through said fluid medium 106 by said one or more magnetic heads of said magnetic impeller 116. In one embodiment, said one or more magnetic heads can pull said one or more shards 110a even through a portion of said tank 104 at said base portion 504.

Figure 7A:
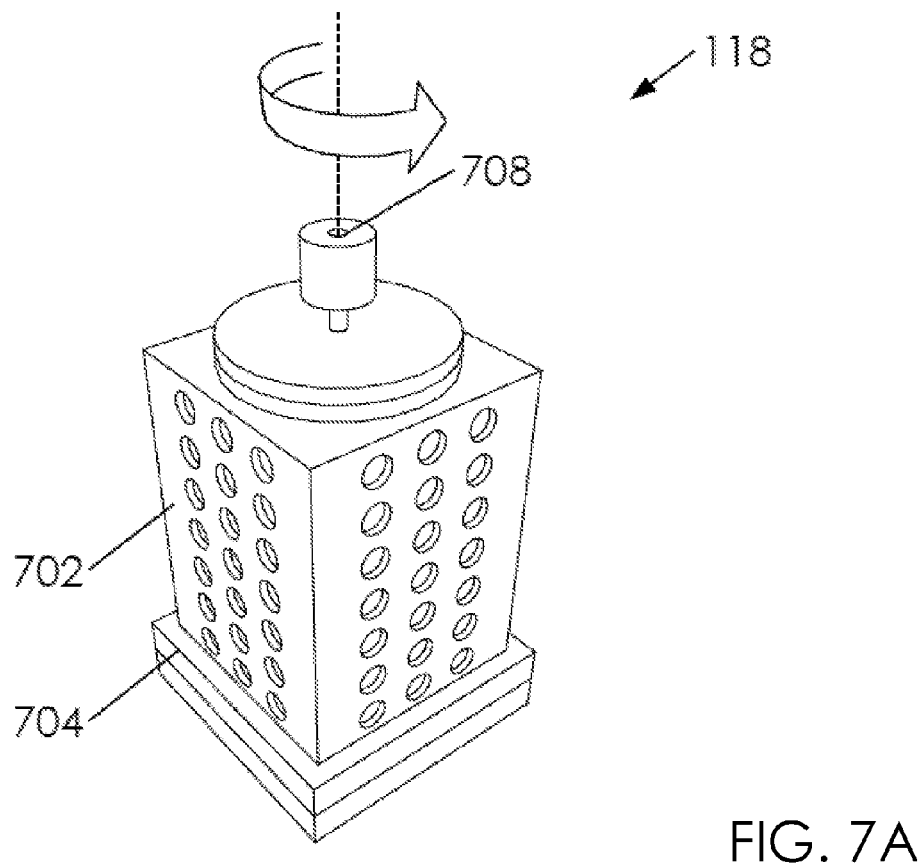
FIGS. 7A and 7B illustrate said a perspective overview and an elevated front view of said first driver.
Figure 7B:
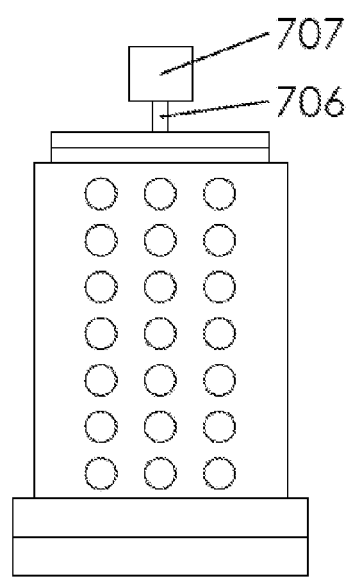

FIGS. 7A and 7B illustrate said a perspective overview and an elevated front view of said first driver 118. In one embodiment, said first driver 118 can comprise a body 702, a base 704, a drive shaft 706, a head 707, a bit grip 708 and a motor (not illustrated). In one embodiment, said body 702 is free to move slightly (or wobble) relative to said base 704; accordingly, said first driver 118 can give while twisting said fluid impeller 114 and/or said magnetic impeller 116. In one embodiment, first driver 118 and said second driver 120 are substantially similar. In one embodiment, said drive shaft 706 can connect said body 702 to said head 707. In one embodiment, said bit grip 708 can grip a portion of said shaft 602 and/or said shaft 402. In one embodiment, said first driver 118 and/or said aperture 220 can revolve said head 707 so as to provide a rotary drive source.

Figure 8:
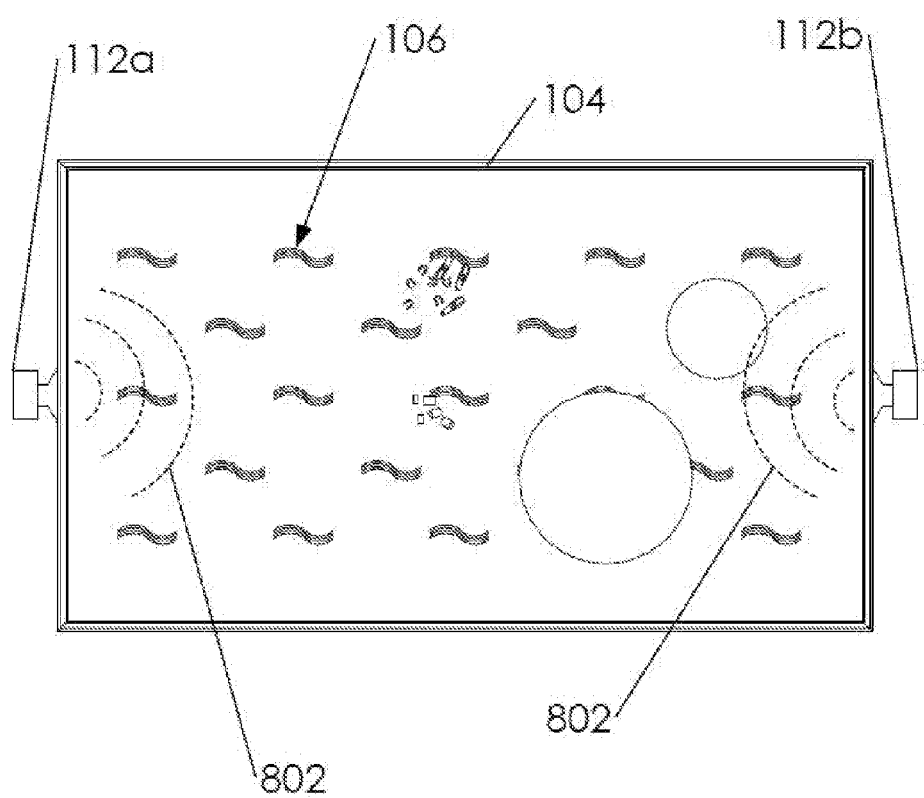
FIG. 8 illustrates an elevated top view of said tank with one or more of said one or more speakers.

FIG. 8 illustrates an elevated top view of said tank 104 with one or more of said one or more speakers. In one embodiment, said one or more speakers can generate a one or more sound waves 802 at or near said tank 104. In one embodiment, said fluid medium 106 can comprise non-Newtonian fluid. In one embodiment, when said one or more sound waves 802 hit said fluid medium 106, said fluid medium 106 can stiffen and vibrate generating an aesthetically pleasing visual effect, well known in the art. In one embodiment, when said one or more speakers are running, said one or more non-stationary objects are in motion, and/or said one or more stationary objects stand above said fluid medium 106, another aesthetically pleasing visual effect can be generated.

Figure 9:
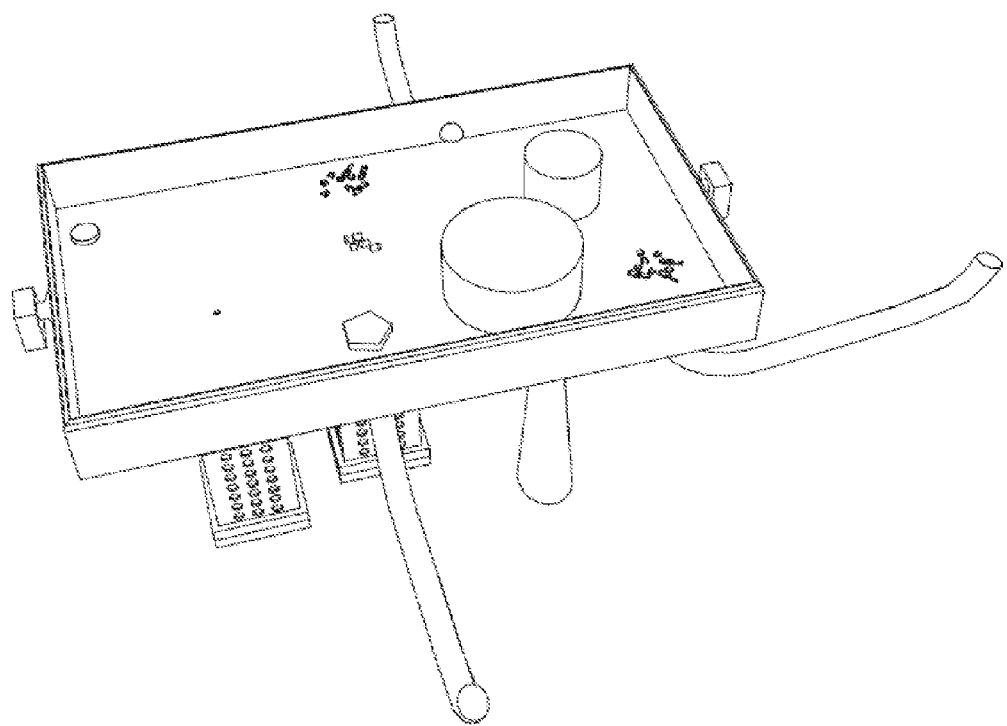
FIG. 9 illustrates a perspective overview of said dynamic illustrator without said fluid medium in use.

FIG. 9 illustrates a perspective overview of said dynamic illustrator 100 without said fluid medium 106 in use. In one embodiment, said dynamic illustrator 100 need not have said fluid medium 10. In one embodiment, said one or more non-stationary objects and/or said one or more stationary objects can generate an aesthetically pleasing visual effect as can be known in the art.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A dynamic illustration generation system comprising:
    a tank having a plurality of retaining walls and a base portion;
    a fluid medium comprising a non-Newtonian fluid;
    a fluid impeller;
    a rotary drive source attached to said fluid impeller;
    an one or more non-stationary objects within said tank;
    a one or more magnets;
    said one or more non-stationary objects comprise ferromagnetic materials attracted to magnets; and
    said one or more magnets move said one or more non-stationary objects within said tank.

2. The dynamic illustration generation system of claim 1 wherein,
    a one or more speakers selectively generating one or more sound waves near said tank.

3. The dynamic illustration generation system of claim 2 wherein,
    said non-Newtonian fluid comprises a washable paint.

4. The dynamic illustration generation system of claim 2 wherein,
    said one or more speakers abut one or more of said plurality of retaining walls of said tank.

5. The dynamic illustration generation system of claim 2 wherein,
    said one or more speakers abut said base portion of said tank.

6. The dynamic illustration generation system of claim 1 further comprising,
    a one or more magnetic handles each having a handle portion and a magnet portion;
    said magnet portion comprise one or more of said one or more magnets; and
    said one or more magnetic handles selectively moving a portion of said one or more non-stationary objects.

7. The dynamic illustration generation system of claim 1 wherein,
    said one or more magnets move along a predefined path and thereby move said one or more non-stationary objects along a corresponding predefined path.

8. The dynamic illustration generation system of claim 7 further comprising,
    a magnetic impeller having a shaft, a one or more arms, and one or more of said one or more magnets attached to said one or more arms;
    said magnetic impeller revolves about said shaft; and
    said predefined path comprises a rotary path of said one or more magnets attached to said one or more arms.

9. The dynamic illustration generation system of claim 1 further comprising,
    one or more non-stationary objects comprising non-ferromagnetic materials not attracted to magnets.

10. The dynamic illustration generation system of claim 9 wherein, said one or more nonstationary
    objects comprising non-ferromagnetic materials not attracted to magnets comprise golf balls.

11. The dynamic illustration generation system of claim 1 further comprising,
    a one or more speakers; and
    a control system attached to said one or more speakers.

12. The dynamic illustration generation system of claim 1 further comprising,
    a one or more rotary drivers providing said rotary drive source; and
    a control system attached to said one or more rotary drivers.

13. The dynamic illustration generation system of claim 1 further comprising,
    a one or more rotary drivers providing said rotary drive source.

14. The dynamic illustration generation system of claim 1 further comprising,
    a one or more stationary objects having a height greater than a depth of said fluid medium; wherein,
    said one or more stationary objects are fixed to a portion of said tank.

15. A dynamic illustration generation system comprising:
    a tank having a plurality of retaining walls and a base portion;
    a fluid medium;
    a fluid impeller;
    a rotary drive source attached to said fluid impeller;
    said fluid medium comprises a non-Newtonian fluid;
    a one or more speakers selectively generating one or more sound waves near said tank;
    an one or more non-stationary objects within said tank; and
    a one or more magnets; wherein,
        said one or more non-stationary objects comprise ferromagnetic materials attracted to magnets, and
        said one or more magnets move said one or more non-stationary objects within said tank.

16. A dynamic illustration generation method comprising:
    filling a tank with a fluid medium,
    attaching a fluid impeller attached to a rotary drive source, and
    stirring said fluid medium with said fluid impeller; and wherein,
        said tank having a plurality of retaining walls and a base portion,
        said fluid medium comprising a non-Newtonian fluid,
        said rotary drive source attached to said fluid impeller,
        an one or more non-stationary objects within said tank,
        a one or more magnets,
        said one or more non-stationary objects comprise ferromagnetic materials attracted to magnets, and
        said one or more magnets move said one or more non-stationary objects within said tank.

17. The dynamic illustration generation method of claim 16 further comprising
    generating a one or more sound waves near said tank with a one or more speakers.

18. The dynamic illustration generation method of claim 16 further comprising
    moving one or more one or more non-stationary objects in said support structure with one or more magnets.

* * * * *